Patented Aug. 12, 1941

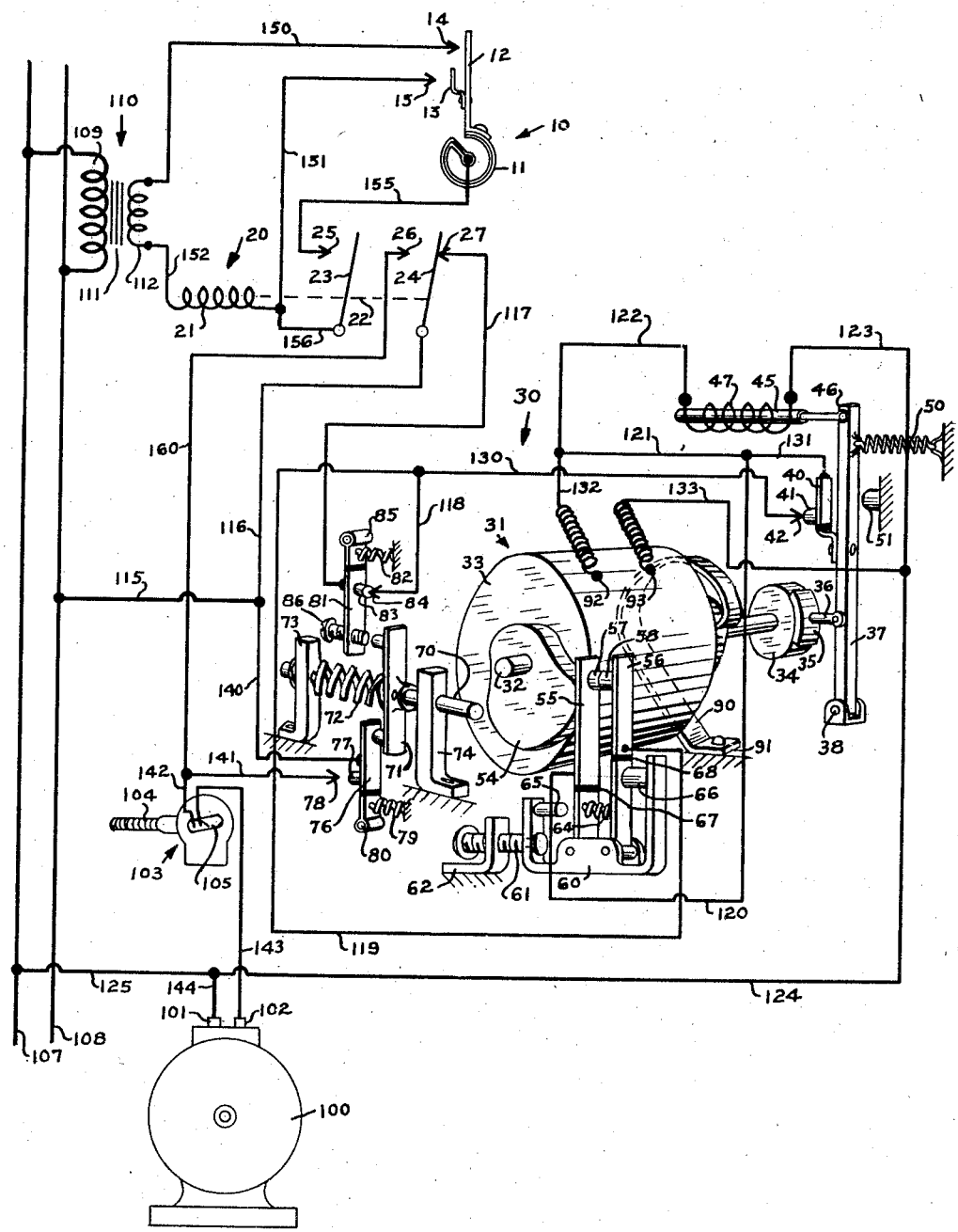
INVENTORS
*Albert E. Baak*
*Guy M. Brown*
BY
ATTORNEY

2,252,154

UNITED STATES PATENT OFFICE 2,252,154

FUEL FEEDING CONTROL SYSTEM

Albert E. Baak and Guy M. Brown, Minneapolis, Minn., assignors to Minneapolis-Honeywell Regulator Company, Minneapolis, Minn., a corporation of Delaware Application December 27, 1937, Serial No. 181,954

8 Claims. (Cl. 236—46)

This invention relates to a timing mechanism for periodically causing the actuation of an operating mechanism, and more particularly for periodically causing the actuation of a motor operated stoker for feeding solid fuel into a furnace.

In a stoker fired furnace, wherein the stoker is controlled by a thermostat located in a space being heated, provision must be made to cause operation of the stoker at frequent enough intervals to maintain combustion, even if the room thermostat is satisfied. This is particularly true in mild weather, when the thermostat is calling for heat at infrequent intervals, and unless the stoker is caused to operate occasionally, there is a danger of the fire burning out if a long enough period elapses between calls for heat by the thermostat.

In order to overcome this difficulty, we have provided a control system wherein a timer is provided, and is caused to operate only when the room thermostat is satisfied, or is not calling for heat, the timer periodically causing operation of the stoker for predetermined periods, and when the thermostat is calling for heat, the stoker is caused to run continuously until the thermostat is satisfied, and the timer is caused to move to an initial position in which it remains until the thermostat is satisfied.

It is therefore an object of our invention to provide an improved timing mechanism for periodically causing the actuation of an operating mechanism.

More specifically, it is an object of our invention to provide an improved timing mechanism for periodically causing the actuation of a stoker during periods when the thermostat which also controls the operation of the stoker is not calling for heat, and for rendering the timing means inoperative during periods that the thermostat is calling for heat.

Other objects will become apparent upon a study of the specification and claims taken in conjunction with the accompanying drawing, wherein is illustrated diagrammatically a preferred form of the invention.

Referring more particularly to the drawing, a room thermostat is indicated by the reference character 10. This thermostat may comprise a bimetallic element 11, contact arms 12 and 13, and fixed contacts 14 and 15 cooperating with the arms 12 and 13, respectively. It will be noted that arm 12 is positioned nearer contact 14 than is arm 13 with respect to contact 15. Arm 12 may be made flexible so that upon a drop in the room temperature, arm 12 will first engage contact 14 and upon a further drop in temperature arm 13 will engage contact 15, this engagement being permitted by reason of the flexibility of arm 12.

Controlled by the thermostat 10 is a relay 20, this relay comprising a coil 21, an armature 22, switch blades 23 and 24, and fixed contacts 25, 26, and 27. Arms 23 and 24 are moved into engagement with contacts 25 and 26 upon energization of the relay coil 21, and upon deenergization thereof the arms move out of engagement with these contacts and arm 24 moves into engagement with contact 27.

The timing mechanism is indicated generally by the reference character 30, this timing mechanism including motor 31 having armature shaft 32 which is suitably rotatably mounted, and this armature shaft provides the supporting means for motor 31. The motor casing 33 which may carry the customary field windings may be suitably connected to the armature shaft 32 by reduction gearing, (not shown), so that upon energization of the motor, the motor casing 33 will rotate very slowly if shaft 32 is prevented from rotating. Fixedly mounted on shaft 32 is a brake drum 34 and cooperating therewith is a brake shoe 35 connected by means of rod 36 to a brake actuating lever 37. Lever 37 is pivoted at 38 and intermediate its ends carries a contact arm 40 on which is mounted a contact 41 cooperating with a fixed contact 42. At its extreme upper end an armature 45 is pivoted at 46 to the lever 37. Surrounding the armature 45 is a solenoid 47, which, when energized, causes the lever 37 to pivot in a counter-clockwise direction about the pivot 38 thus bringing the brake shoe 35 into braking engagement with the drum 34 and preventing rotation of shaft 32. At the same time contact 41 is moved into engagement with the fixed contact 42. A spring 50 is provided for moving the lever 37 in a clockwise direction about pivot 38 when solenoid 47 is deenergized and a stop 51 is provided for limiting this movement of the lever 37. When the lever is so moved by the spring 50, contact 41 is moved out of engagement with contact 42 and brake shoe 35 is moved out of braking engagement with the drum 34.

Fixedly mounted to one end of the motor casing 33 is a cam 54. Cooperating with the cam 54 is a pair of switch arms 55 and 56 carrying contacts 57 and 58, respectively. These switch arms may be pivoted in a U-shaped supporting frame 60 which is mounted for adjustment with respect to the motor by means of a screw 61 mounted in a bracket 62 and connected to one leg of the U-shaped frame 60. Spring 64 biases the arm 55 away from the arm 56 and this movement of the arm may be limited by means of a stop 65 mounted on the left-hand leg of the U-shaped frame 60. A stop 66 is mounted on the other leg of the U-shaped frame 60 and limits movement of the arms 55 and 56 to the right. Suitable insulating material 67 and 68 may be interposed in the arms 55 and 56 to insulate them from the frame 60.

Mounted in the path of movement of cam 54 when motor casing 33 is rotated in a clockwise direction, as viewed in the drawing, is a plunger 70 carrying a switch actuating arm 71 which may be formed of suitable insulating material, said arm being biased toward the right by a spring 72. Rod 70 may be slidably mounted in brackets 73 and 74. Arranged to be actuated by arm 71 is a switch arm 76 carrying a contact member 77 for engagement with a fixed contact 78 upon movement of arm 76 to the left. A spring 79 biases the arm 76 toward the right and this arm may be suitably pivoted at 80. A second switch arm 81 carrying a contact 83 is normally biased by means of a spring 82 so that contact 83 is moved into engagement with a contact 84, this arm being pivoted at 85. An adjusting screw 86 may be carried by the lower end of the arm 81 so that the time of engagement of the arm 71 therewith may be suitably adjusted.

Motor casing 33 is normally biased in a counter-clockwise direction by means of a coil spring 90 suitably connected to the motor casing and fixedly connected at 91. Terminals 92 and 93 are carried by the motor casing and form the electrical connections for the motor.

A motor represented by the reference character 100 may be suitably connected to a coal stoker, for example, or other suitable fuel feeding device. This motor carries terminals 101 and 102 for connection to a suitable source of power.

A switch 103 may be suitably mounted in the furnace and acts as a limit switch as will be hereinafter set forth to prevent operation of the motor 100 upon the attainment of an excessive temperature in the furnace. This switch may comprise a conventional bimetallic element 104 suitably connected to a mercury switch 105 so that when the temperature affecting the element 104 reaches a predetermined value the switch 105 will be tilted in the opposite position from that shown, thus interrupting the circuit therethrough.

Lines 107 and 108 may be connected to a suitable source of power (not shown), and connected across these lines is a primary 109 of a transformer 110. This transformer also includes a core 111 and a secondary 112.

*Operation*

With the thermostat 10 in the position illustrated the temperature in the space being heated is at a sufficiently high value. Relay 20 is deenergized and motor 31 is in what may be termed its initial position, having been biased thereto by the spring 90, switch arms 55 and 56 engaged by the cam 54 limiting the movement of the motor 31 under the influence of spring 90. Contacts 57 and 58 are closed by the cam 54 and a circuit is therefore formed through the solenoid 47 as follows: from line 108 through conductors 115, 116, blade 24 of relay 20, contact 27, conductor 117, arm 81, contact 83, contact 84, conductors 118, 119, arm 56, contacts 58 and 57, arm 55, conductors 120, 121, 122 through the solenoid 47, conductors 123, 124, and 125 to the line 107. Energization of solenoid 47 causes movement of lever 37 about pivot 38 in a counter-clockwise direction whereupon brake shoe 35 is moved into braking engagement with drum 34 and contact 41 is moved into engagement with contact 42. Engagement of contacts 41 and 42 form a parallel circuit through solenoid 47 which is independent of switch arms 55 and 56, this circuit being as follows: from line 108 through conductors 115, 116, blade 24 of relay 20, contact 27, conductor 117, arm 81, contacts 83 and 84, conductors 118 and 130, contacts 42 and 41, arm 40, conductors 131, 121, 122, solenoid 47, conductors 123, 124, and 125 to the line 107. It will therefore be apparent that solenoid 47 will remain energized as long as current flows through this last described circuit regardless of contacts 57 and 58. Motor 33 is energized through the following circuit: from line 108, through conductors 115, 116, relay blade 24, contact 27, conductor 117, arm 81, contacts 83 and 84, conductors 118, 130, contacts 42, 41, arm 40, conductors 131, 121, 132, to terminal 92 of motor 31 through the motor to terminal 93 and conductors 133, 124, and 125 to the line 107. Energization of motor 31 causes it to slowly rotate in a clockwise direction, as viewed in the drawing, about shaft 32 since this shaft is held fast by the braking means 34 and 35. It should be noted that these circuits are dependent upon the engagement of relay blade 24 and contact 27, and engagement of contacts 83 and 84.

After the elapse of a predetermined length of time, cam 54 which is moved with the motor casing 33 will engage rod 70 causing it to move toward the left and moving with it arm 76 until contact 77 engages the fixed contact 78. It should also be noticed at this time that cam 54 has moved out of engagement with the arm 55 so that contact 57 is moved out of engagement with contact 58 by reason of the biasing spring 64. Engagement of contacts 77 and 78 cause the motor 100 to be energized by the following circuit: from the line 108 through conductors 115, 140, arm 76, contacts 77 and 78, conductors 141, 142 through the switch 105, conductor 143 to motor terminal 102 through the motor to terminal 101 and conductors 144 and 125 to the line 107. Energization of motor 100 causes fuel to be fed to the furnace and this operation will continue for a predetermined length of time or until cam 54 is moved far enough so that contact 83 carried by arm 81 is moved out of engagement with contact 84. When this happens the circuits through solenoid 47 and through the motor 31 are interrupted whereupon spring 50 moves lever 37 about pivot 38 in a clockwise direction, brake shoe 35 moves out of engagement with drum 34 and contact 41 moves out of engagement with the fixed contact 42. Spring 90 is now effective to quickly rotate motor 31 and shaft 32 in a counter-clockwise direction back to its initial position. This rapid movement is made possible since shaft 32 is at this time free to rotate and the casing does not have to rotate with respect to the shaft 32 through the reduction gearing housed therein. During the return movement of the motor to its initial position, the circuit through motor 100 is interrupted since spring 79 is free to move arm 76 carrying contact 77 away from the fixed contact 78. When the motor reaches the initial position, contact 57 is again moved into engagement with contact 58, solenoid 47 is again energized and brake shoe 35 is again moved into braking engagement with the drum 34 and the above described cycle of operation is repeated. These cycles of operation will continue as long as thermostat 10 remains in its satisfied position as illustrated and as long as the temperature within the furnace does not reach such an excessive value that switch 105 is tilted to its open position. In this manner, fuel is intermittently fed to the furnace for short predetermined periods of time so that danger of the fire burning out will be eliminated. The period of time during which the motor 100 is not operating is determined by the length of time it takes cam 54 to rotate to such a position that contact 77 is moved into engagement with contact 78 and this time may be controlled by means of the adjusting screw 61 varying the position of the U-shaped bracket 60 and the initial position of the motor. The length of the firing period may be varied by adjusting screw 86 carried by arm 81 so that arm 81 will move into engagement with screw 86 at a time determined by the adjustment of this screw.

Assume now that the motor 31 is being rotated in a clockwise direction and that the temperature in the space being heated drops to such a value that arms 12 and 13 move into engagement with contacts 14 and 15. The engagement of arm 12 with contact 14 in itself does not cause any circuit to be established but when arm 13 moves into engagement with contact 15 a circuit is established through relay coil 21 as follows: from transformer secondary 112 through conductor 150, contact 14, arms 12 and 13 of thermostat 10, contact 15, conductor 151, relay coil 21 and conductor 152 to the other side of secondary 112. Energization of the relay coil 21 causes blades 23 and 24 to move into engagement with contacts 25 and 26. Upon blade 24 moving out of engagement with contact 27 solenoid 47 and motor 31 are immediately deenergized and the motor is quickly returned to its initial position by means of the spring 90, as previously described. The motor will remain in this position as long as relay 20 is energized since the circuits for the motor and solenoid 47 are dependent upon the engagement of blade 24 and contact 27.

Engagement of the relay blade 23 with contact 25 establishes a holding circuit for the relay coil 21 which is independent of engagement of arm 13 and contact 15, this circuit being as follows: from the transformer secondary 112 through conductor 150, contact 14, arm 12, bimetallic element 11, conductor 155, contact 25, blade 23, conductor 156, relay coil 21, and conductor 152 to the other side of secondary 112. It will therefore be seen that the relay coil 21 will remain energized as long as arm 12 of thermostat 10 is in engagement with contact 14.

Engagement of blade 24 with contact 26 causes current to flow through the motor 100 by the following circuit: from the line 108 through conductors 115, 116, blade 24, contact 26, conductors 160, 142, switch 105, conductor 143, terminal 102 through the motor to terminal 101 and conductors 144 and 125 to the line 107. Motor 100 will now operate and will continue to feed fuel to the furnace until the temperature within the space being heated rises to such a value that arm 12 of thermostat 10 moves away from contact 14. In the event, however, that during this time the temperature within the furnace should reach an excessive value, switch 105 will be tilted by the bimetallic element 104 to a position to interrupt the flow of current through motor 100 thus stopping the motor.

After the room thermostat has become satisfied, relay 20 becomes deenergized and blade 24 moves into engagement with contact 27 whereupon the aforedescribed cycle of operation of the timer 30 again starts.

It will thus be seen that with our system the motor 100 will operate continuously when there is a call for heat in the space being heated and whenever the room thermostat is satisfied the timer will function to cause the motor 100 to operate at predetermined intervals in order to insure that the fire does not burn out. Since the timer 30 moves immediately towards initial position when the thermostat calls for heat within the space, the timer always maintains the motor 100 shut down for a predetermined period as determined by the length of the off period of the timer. This is a distinct advantage over many of the known systems wherein a timer controls a stoker motor but is not returned to an initial position upon a call for heat by the room thermostat so that when the stoker motor stops operating by reason of the thermostat becoming satisfied, the timer may start the stoker again operating before a sufficient time has elapsed.

Having described a preferred form of our invention, many modifications may become apparent to those skilled in the art and we wish it to be understood that our invention is to be limited only by the scope of the appended claims.

We claim as our invention:

1. In a system of the class described, a main control switch, an operating means, means responsive to movement of said main control switch to a first position for causing operation of said operating means, timing means, means biasing said timing means to an initial position, switch means biased to open position and held closed by said timing means when said timing means is in its initial position, circuit means including said switch means for energizing said timing means, means responsive to movement of said main control switch to a second position for completing said circuit means, second switch means in parallel with said first switch means, means responsive to movement of said main control switch to the second position and to closure of said first switch means for closing said second switch means, means responsive to movement of said timing means to a second position for causing operation of said operating means, and means responsive to movement of said timing means to a third position for causing the opening of said second switch means, whereby the timing means is deenergized and is moved by the biasing means to the initial position thus causing the closure of the first switch means which in turn causes the closure of the second switch means.

2. In a system of the class described, temperature responsive means, fuel feeding means, means responsive to movement of said temperature responsive means to a predetermined position for causing operation of said fuel feeding means, timing means, means biasing said timing means to an initial position, switch means biased to open position and held closed by said timing means when said timing means is in the initial position, circuit means including said switch means for energizing said timing means, means responsive to movement of said temperature responsive means to a second position for completing said circuit means, second switch means in parallel with said first switch means, means responsive to movement of said temperature responsive means to the second position and to closure of said first switch means for closing said second switch means, means responsive to movement of said timing means to a second position for causing operation of said fuel feeding means, and means responsive to movement of said timing means to a third position for causing the opening of said second switch means, whereby the timing means is deenergized and is moved by the biasing means to the initial position thus causing the closure of the first switch means which in turn causes the closure of the second switch means.

3. In apparatus of the type described, in combination, a timing device comprising a movable element and driving means therefor, biasing means urging said element into an initial position, said element moving into initial position whenever said timing means are deenergized, a switch operable by said device, said switch being closed only when said element is in initial position, control means for energizing said timing device through said switch, said control means including means for completing a maintaining circuit for said device upon initial energization thereof, switch means operable by said device for interrupting said maintaining circuit after a given period of operation of said timing device whereby it returns to initial position.

4. In apparatus of the type described, in combination, a timing device comprising a movable element and driving means therefor, biasing means urging said element into an initial position, said element moving into initial position whenever said timing means are deenergized, a switch operable by said device, said switch being closed only when said element is in initial position, control means for energizing said timing device through said switch, said control means including means for completing a maintaining circuit for said device upon initial energization thereof, switch means operable by said device for interrupting said maintaining circuit after a given period of operation of said timing device whereby it returns to initial position, and means comprising another switch actuatable by said device when it is near the end of said given period of operation.

5. In apparatus of the type described, in combination, a timing device comprising a movable element and driving means therefor, biasing means urging said element into an initial position, said element moving into initial position whenever said timing means are deenergized, a switch operable by said device, said switch being closed only when said element is in initial position, control means for energizing said timing device through said switch, said control means including means for completing a maintaining circuit for said device upon initial energization thereof, switch means operable by said device for interrupting said maintaining circuit after a given period of operation of said timing device whereby it returns to initial position, and thermostatic means controlling said control means in a manner whereby said timing device remains deenergized when said thermostatic means demands heat and becomes energized when said thermostatic means are satisfied.

6. In apparatus of the character described, in combination, an automatic stoker, control means for the stoker comprising a space thermostat and an electrical timing device, said timing device having an initial position and including means whereby upon being energized the device establishes a maintaining circuit for itself and operates through a predetermined cycle and then interrupts the maintaining circuit and returns to initial position, switch means controlling the stoker and actuatable by said device near the end of said cycle for operating the stoker for a relatively short interval, and means whereby the thermostat controls the timing device to immediately deenergize and return the device to initial position when the thermostat demands stoker operation and for energizing the timing device when the thermostat becomes satisfied.

7. In apparatus of the character described, in combination, an automatic stoker, control means therefor comprising a thermostat in a space to be heated and an electrically driven timing device, said device comprising a movable element and means biasing said element whereby said element is moved to an initial position when the timing device is deenergized, said space thermostat controlling said timing device to immediately return said element to initial position and maintain it in initial position when the thermostat is demanding heat and immediately energizing the timing device when the thermostat is satisfied, switch means controlling the stoker actuatable by said element after a given period of operation of the timing device, and a switch subsequently actuatable by said element for interrupting the energization of the timing device whereby said element returns to initial position.

8. In apparatus of the character described, in combination, an automatic stoker, control means therefor comprising a thermostat in a space to be heated and an electrically driven timing device, said device comprising a movable element and means biasing said element whereby said element is moved to an initial position when the timing device is deenergized, said space thermostat controlling said timing device to immediately return said element to initial position and maintain it in initial position when the thermostat is demanding heat and immediately energizing the timing device when the thermostat is satisfied, switch means controlling the stoker actuatable by said element after a given period of operation of the timing device, and a switch subsequently actuatable by said element for interrupting the energization of the timing device whereby said element returns to initial position, and switch means closed by said element when the element is in initial position whereby the timing device is reenergized provided the thermostat is still satisfied.

ALBERT E. BAAK.
GUY M. BROWN.